US009152947B2

(12) United States Patent
Sherman et al.

(10) Patent No.: US 9,152,947 B2
(45) Date of Patent: Oct. 6, 2015

(54) REAL-TIME SOCIAL NETWORKING

(75) Inventors: Yahali Sherman, Tel Aviv (IL); Vitaly Vainer, Kfar Saba (IL); Ariel Tammam, Ramat Gan (IL); Eli Ben-David, Mevasseret-Zion (IL)

(73) Assignee: SAP Portals Isreal Ltd, Ra'anana (IL)

( * ) Notice: Subject to any disclaimer, the term of this patent is extended or adjusted under 35 U.S.C. 154(b) by 315 days.

(21) Appl. No.: 13/310,913

(22) Filed: Dec. 5, 2011

(65) Prior Publication Data
US 2013/0144957 A1   Jun. 6, 2013

(51) Int. Cl.
*G06Q 10/10* (2012.01)
*G06Q 50/00* (2012.01)

(52) U.S. Cl.
CPC .............. *G06Q 10/10* (2013.01); *G06Q 50/01* (2013.01)

(58) Field of Classification Search
CPC ........ G06F 17/30; G06Q 10/10; G06Q 50/01; H04W 4/206; H04L 67/22; H04L 67/306
USPC ............................... 709/205–207; 707/769, 3
See application file for complete search history.

(56) References Cited

U.S. PATENT DOCUMENTS

| 8,234,143 | B1 * | 7/2012 | Brewer et al. ................. 705/7.14 |
| 8,321,430 | B2 | 11/2012 | Zvi et al. |
| 8,583,678 | B2 | 11/2013 | Vainer et al. |
| 8,751,558 | B2 | 6/2014 | Bleier et al. |
| 8,819,210 | B2 | 8/2014 | Tammam |
| 8,886,890 | B2 | 11/2014 | Tammam et al. |
| 2002/0049749 | A1 * | 4/2002 | Helgeson et al. ................. 707/3 |
| 2004/0039681 | A1 * | 2/2004 | Cullen et al. ..................... 705/37 |
| 2004/0073443 | A1 * | 4/2004 | Gabrick et al. ................... 705/1 |
| 2004/0128301 | A1 * | 7/2004 | Thint et al. ..................... 707/101 |
| 2004/0199541 | A1 * | 10/2004 | Goldberg et al. .......... 707/104.1 |
| 2005/0182743 | A1 * | 8/2005 | Koenig ............................. 707/1 |
| 2005/0246221 | A1 * | 11/2005 | Geritz et al. ..................... 705/10 |
| 2006/0015456 | A1 * | 1/2006 | Shapiro et al. .................. 705/39 |
| 2006/0085220 | A1 * | 4/2006 | Frank et al. ....................... 705/1 |
| 2006/0184381 | A1 * | 8/2006 | Rice et al. ......................... 705/1 |
| 2007/0016557 | A1 * | 1/2007 | Moore et al. ...................... 707/3 |
| 2007/0094324 | A1 * | 4/2007 | Vata .............................. 709/203 |
| 2007/0300243 | A1 | 12/2007 | Gross et al. |
| 2008/0066150 | A1 * | 3/2008 | Lim ................................. 726/1 |
| 2009/0070426 | A1 * | 3/2009 | McCauley et al. ............ 709/205 |
| 2010/0131418 | A1 * | 5/2010 | McCagg et al. .............. 705/321 |
| 2010/0131502 | A1 * | 5/2010 | Fordham ....................... 707/736 |
| 2010/0324970 | A1 * | 12/2010 | Phelon et al. .................... 705/10 |
| 2011/0029636 | A1 * | 2/2011 | Smyth et al. .................. 709/217 |
| 2011/0054977 | A1 * | 3/2011 | Jaffer ................................ 705/9 |
| 2011/0055017 | A1 * | 3/2011 | Solomon et al. ........... 705/14.66 |
| 2011/0088046 | A1 | 4/2011 | Guertler et al. |
| 2011/0137909 | A1 | 6/2011 | Guertler et al. |
| 2011/0231592 | A1 | 9/2011 | Bleier et al. |
| 2011/0314105 | A1 * | 12/2011 | Chen et al. .................... 709/205 |
| 2012/0005224 | A1 * | 1/2012 | Ahrens et al. ................. 707/769 |
| 2012/0036181 | A1 * | 2/2012 | Isidore .......................... 709/203 |

(Continued)

*Primary Examiner* — Wing F Chan
*Assistant Examiner* — Benjamin M Thieu
(74) *Attorney, Agent, or Firm* — Fish & Richardson P.C.

(57) ABSTRACT

Techniques for exploring social connections in an in-memory database include identifying an attribute in a user profile associated with a first user; executing a query against a data element stored in an in-memory database, the query including the attribute in the user profile; identifying a second user from results of the query, the second user associated with the data element based on a relationship between the second user and the first user defined by the attribute; and generating displayable information associated with the second user.

26 Claims, 6 Drawing Sheets

(56) References Cited

U.S. PATENT DOCUMENTS

| | | |
|---|---|---|
| 2012/0041922 A1 | 2/2012 | Vainer et al. |
| 2012/0066231 A1* | 3/2012 | Petersen et al. ............... 707/748 |
| 2012/0095931 A1* | 4/2012 | Gurion et al. ................. 705/319 |
| 2013/0018777 A1* | 1/2013 | Klein ............................. 705/38 |
| 2013/0086483 A1 | 4/2013 | Vainer et al. |
| 2013/0086495 A1 | 4/2013 | Guzansky et al. |
| 2013/0091132 A1 | 4/2013 | Khalatov et al. |
| 2013/0091149 A1* | 4/2013 | Dunn et al. .................... 707/749 |
| 2013/0091456 A1 | 4/2013 | Sherman et al. |
| 2013/0117701 A1* | 5/2013 | Evans, II ....................... 715/771 |
| 2013/0132420 A1 | 5/2013 | Vainer et al. |
| 2013/0139081 A1 | 5/2013 | Alon et al. |
| 2013/0144957 A1 | 6/2013 | Sherman et al. |
| 2013/0145006 A1 | 6/2013 | Tammam |
| 2013/0159926 A1 | 6/2013 | Vainer et al. |
| 2013/0218594 A1* | 8/2013 | Skocic ............................. 705/3 |
| 2013/0238650 A1* | 9/2013 | Ghosh ........................... 707/758 |
| 2014/0006723 A1 | 1/2014 | Tammam et al. |
| 2014/0013000 A1 | 1/2014 | Vainer et al. |
| 2014/0019533 A1 | 1/2014 | Sherman et al. |
| 2014/0019958 A1 | 1/2014 | Sherman |
| 2014/0040177 A1 | 2/2014 | Sherman et al. |
| 2014/0040178 A1 | 2/2014 | Sherman et al. |
| 2014/0040263 A1 | 2/2014 | Sherman et al. |

* cited by examiner

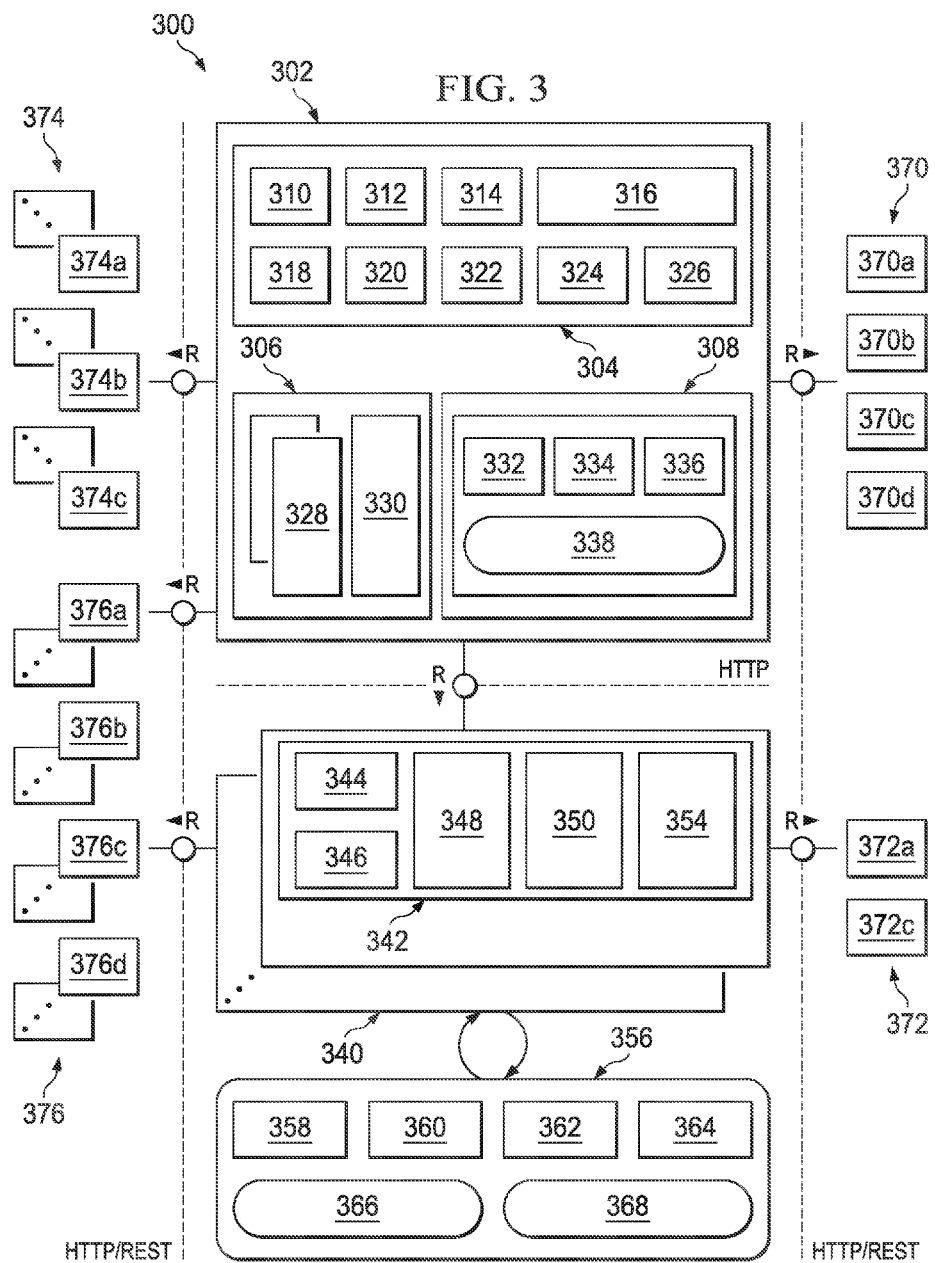

REAL-TIME SOCIAL NETWORKING

TECHNICAL BACKGROUND

This disclosure relates to providing exploration of social connections.

BACKGROUND

Social networking data for members of an organization may be created based on the organization's business data and records. In some instances, such as in a relational database management system environment, a dedicated process for extracting, transforming, loading, and indexing enterprise resource planning data for creating social intelligence data may be required. The extract, transform, and load (ETL) process may result in high performance computation times for building dynamic network graphs. Further, changes to the business data may not be automatically reflected across the system, and accordingly, social data based on the business data may not be fully updated.

SUMMARY

Techniques for exploring social connections in an in-memory database include a general embodiment of apparatus, systems and methods including identifying an attribute in a user profile associated with a first user; executing a query against a data element stored in an in-memory database, the query including the attribute in the user profile; identifying a second user from results of the query, the second user associated with the data element based on a relationship between the second user and the first user defined by the attribute; and generating displayable information associated with the second user.

In a first aspect combinable with the general embodiment, the data element is a data cube.

A second aspect combinable with any of the previous aspects includes performing at least one of: presenting an interface operable to allow the first user to email the second user; presenting an interface operable to allow the first user to send an invitation to the second user; presenting an interface operable to allow the first user to export information to the second user; or presenting an interface to allow additional searches of data elements in the in-memory database based on the information associated with the second user.

In a third aspect combinable with any of the previous aspects, the attribute is related to a current project of the first user.

In a fourth aspect combinable with any of the previous aspects, the query includes an identification of the current project.

In a fifth aspect combinable with any of the previous aspects, the relationship is determined based on identification of members participating in the current project.

In a sixth aspect combinable with any of the previous aspects, the information associated with the second user includes a user profile of the second user.

A seventh aspect combinable with any of the previous aspects includes identifying a change to the data element.

An eighth aspect combinable with any of the previous aspects includes updating the displayable information associated with the second user based on the change to the data element.

In a ninth aspect combinable with any of the previous aspects, the query is executed against a plurality of data elements in the in-memory database.

In a tenth aspect combinable with any of the previous aspects, at least two of the plurality of data elements are from different data sources in the in-memory database.

An eleventh aspect combinable with any of the previous aspects includes, prior to executing the query against the data element stored in the in-memory database, the different data sources are replicated to the in-memory database from one or more enterprise systems communicably coupled to the in-memory database.

In a twelfth aspect combinable with any of the previous aspects, executing a query against a data element stored in an in-memory database comprises executing a query against a data element stored in an in-memory database with an in-memory computational engine in the in-memory database.

A thirteenth aspect combinable with any of the previous aspects includes identifying a plurality of additional users from results of the query.

In a fourteenth aspect combinable with any of the previous aspects, the additional users associated with the data element is based on a relationship between each of the additional users and the first user defined by the attribute.

A fifteenth aspect combinable with any of the previous aspects includes dynamically generating a graphical network representing the first user, the plurality of additional users.

In a sixteenth aspect combinable with any of the previous aspects, the relationship between each of the additional users and the first user is defined by the attribute.

In a seventeenth aspect combinable with any of the previous aspects, the first user and the plurality of additional users are represented as nodes in the graphical network.

In an eighteenth aspect combinable with any of the previous aspects, the relationship between each of the additional users and the first user is defined by the attribute are represented as connections between nodes.

Various embodiments of a social networking module for providing exploration of social connections according to the present disclosure may have one or more of the following features. For example, the social networking module may use data from a variety of different data sources to search for and find contacts within (and external to) a business enterprise that have, for example, specialized knowledge, information, or data regarding a particular enterprise project of product. Further, the social networking module may allow an enterprise user to more easily (e.g., graphically) explore relationships between the user and other enterprise users, thereby allowing collaboration of people, groups, and ideas within the enterprise. The social networking module may draw its data from a range of data sources that have already been replicated into an in-memory database, thereby decreasing total cost of ownership (TCO) and increase scalability. Further, such replicated data may be originated from several existing enterprise systems. In some embodiments, the social networking module may be configured (all or a portion) as part of the in-memory database, thereby further increasing scalability and decreasing TCO and eliminating (at least partially) offline and online data transformation. Thus, the social networking module may utilize less memory and data consumption to increase response times (e.g., by performing calculations close in proximity to underlying data). Further, in some example embodiments, the social networking module may dynamically create a graphical network including the relationships between the user and other enterprise users based on, for instance. current user roles that also are dynamically adjusted.

These general and specific aspects may be implemented using a device, system or method, or any combinations of devices, systems, or methods. The details of one or more

DESCRIPTION OF DRAWINGS

FIG. 3 illustrates an example virtual distributed computing system operable to generate, view, modify, and/or otherwise manipulate a contextual workspace according to the present disclosure;

DETAILED DESCRIPTION

Figure 1:
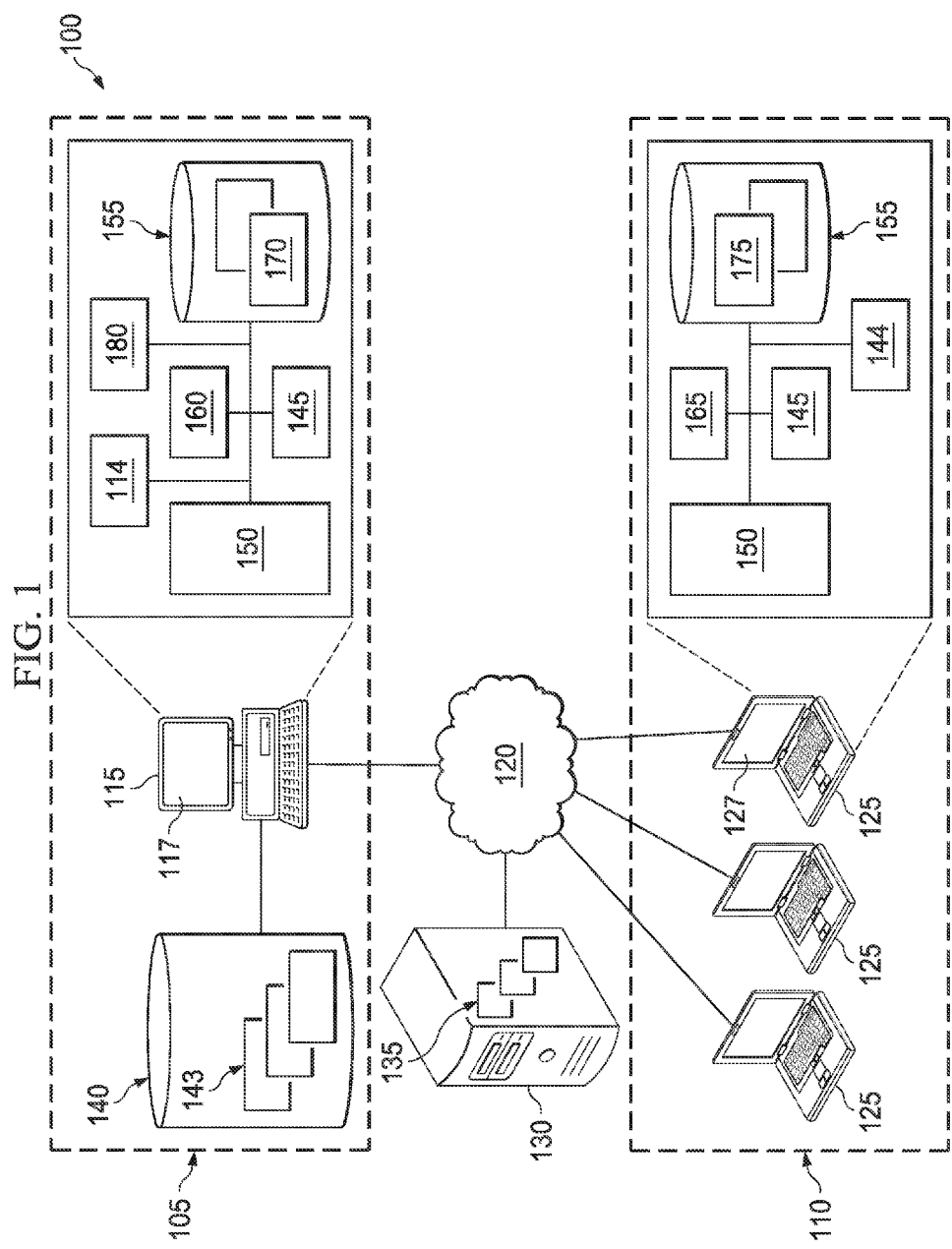
FIG. 1 illustrates an example distributed computing system operable to provide exploration of social connections according to the present disclosure.

FIG. 1 illustrates an example distributed computing system 100 operable to facilitate real-time social networking. Social networks within an organization may be identified or formed based on business data of the organization. In some implementations, the business data may include data objects stored in an in-memory database, which allows for fast manipulations on large amounts of data. Data objects in the in-memory database may be comprised of business data represented in a particular view, or data cube. Alternatively, the business data may be stored in and/or referenced by other data objects, such as, for example, relational databases, reports, documents, tables, and other objects or repositories. The data cube represents a data model or data object defining a predefined or pre-calculated view on business data. Accordingly, the data cube can be referred to as a calculated view. The business data may be connected and/or related according to any of a variety of contexts, such as, for example, a particular business issue or problem, a particular product or service, a particular organizational unit and/or portion of a business enterprise, across a particular position and/or user role found within the business enterprise, and other contexts.

In some embodiments, a "user role" may be a role of a user within his/her business enterprise as determined in the enterprise's corporate human resource (HR) system(s) and its affinity to groups and departments, and a role that may be a dynamically calculated business network relationship within the enterprise based on business solutions developed through one or more enterprise applications. It may include, but not be limited to, participation in particular projects, having particular expertise, participation in the same (e.g., ad hoc) working groups, and otherwise.

As explained more fully below, the business data may be used to identify and present social networking relationships. The business data may include information regarding various attributes of members of a business organization. Examples of such attributes may include contact information, expertise, past projects, current projects, manager, supervisor, and the like. In some instances, the attributes may be included in a member's profile. The attributes may be used to search for members having certain attributes or for different relationships among members of the organization based on one or more particular attributes. In certain instances, the attributes may be clustered to identify members to include in a social group or to filter potential relationships for relevant information. The attributes identified from the business data, and potential relationships based on the attributes, may be graphically presented to a user.

In some implementations, a range of various business objects are replicated in an in-memory database, which may allow access to different existing models of business data in the in-memory database and graphical presentation of potential extensions of the existing models. In some instances, drawing data from a range of data resources allows creation of a composite profile for each member of a network. For example, data can be extracted from various systems in an in-memory database, such as Human Capital Management (HCM), Customer Relationship Management (CRM), or Supplier Relationship Management (SRM), for example. Attributes from an organization member's profile may be found in existing data models (e.g., point-of-sale data cube). The attributes may be used to search for and identify additional relationships or connections with the member. The additional relationships or connections may be graphically presented to a user, allowing the user to select certain relationships to explore or potential connections to connect (e.g., safety information related to a product versus how well the product sold), or to extend the existing models to include the additional data.

At least one potential benefit of implementing social networking using data objects in an in-memory database is that, in some instances, a dedicated extract, transform, and load (ETL) process may not be needed to process data for identifying and presenting relationships in a social context. Direct queries may be executed against the in-memory database to search for potential relationships and entities, providing immediate access to social data in the network. Accordingly, certain tasks that may otherwise be needed to update data, configure data mappings, or index data for search results (i.e., an ETL process or mapping) may no longer be required. User profiles may be dynamically generated or updated based on data sources in the in-memory database. Social connections, profile data, potential relationships, and related options may be updated in "real-time" to reflect changes to the underlying data objects as they occur. In particular, changes to data from different data sources (e.g., Human Resources vs. Customer Relationship Management) or business systems in a relational database management system (RDBMS), for example, may typically be expensive or require a lengthy time to replicate. Accessing social data in an in-memory database, however, may enable real-time analysis of social networks and trends, updates to user profiles, and access to socially relevant information.

Users may expand their social networks based on data objects in the in-memory database. For example, an account executive may expand her network view according to new Customer Relationship Management (CRM) data or a finance controller may enhance her network view based on data from her cost center. Social networking graphs, relationship diagrams, and data-intensive social algorithms may be enhanced and generated faster. Further, using data objects in an in-memory database to facilitate social networking, which may ensure aggregation of data sources without performance breaches, may contribute to a strong network-based permission model for the enhanced security requirements associated with social networking. If changes are made to the permission model, they may be replicated in real-time through the in-memory database.

The illustrated computing environment 100 includes a server system 105, a client system 110, and a remote computing system 130 communicably coupled through a network 120. Although illustrated as single systems, each of the systems 105, 110, and 130 may include more than one system and/or more than one computing device (e.g., computer, laptop, server, mobile device, and otherwise) within a distributed computing environment. In general, computing environment 100 depicts an example configuration of a system capable of providing stateful execution of stateless applications in a substantially transparent way, as well as dynamically determining the particular application's mode of operation in response to requests from its clients (e.g., client appliances 125).

The illustrated server system 105 includes one or more server appliances 115 having corresponding graphical user interfaces (GUIs) 117. In general, the server appliance 115 is a server that stores one or more applications, where at least a portion of the applications are executed via requests and responses sent to users or clients within and communicably coupled to the illustrated environment 100 of FIG. 1. In some instances, the server appliance 115 may store a plurality of various hosted applications, while in other instances, the server appliance 115 may be a dedicated server meant to store and execute only a single hosted application (e.g., the contextual workspace (server) 160 or the graphical exploration module 180). In some instances, the server appliance 115 may comprise a web server, where the applications, such as the graphical exploration module 180, represent one or more web-based applications accessed and executed via network 120 by the client appliances 125 of the environment 100 to perform the programmed tasks or operations of the hosted applications.

At a high level, the server appliance 115 comprises an electronic computing device operable to receive, transmit, process, store, or manage data and information associated with the environment 100. Specifically, the server appliance 115 illustrated in FIG. 1 is responsible for receiving application requests from one or more applications (e.g., associated with the clients 125 of environment 100) and responding to the received requests by processing said requests in the associated hosted application 114, and sending the appropriate response from the hosted application 114 back to the requesting client application 144. In addition to requests from the external clients 125 illustrated in FIG. 1, requests associated with the hosted applications 114 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server appliance 115, environment 100 can be implemented using two or more server appliances 115, as well as computers other than servers, including a server pool. Indeed, server appliance 115 may be any computer or processing device such as, for example, a blade server, general-purpose personal computer (PC), Macintosh, workstation, UNIX-based workstation, or any other suitable device (e.g., smartphones, PDAs, tablets). In other words, the present disclosure contemplates computers other than general purpose computers, as well as computers without conventional operating systems. Further, illustrated server appliance 115 may be adapted to execute any operating system, including Linux, UNIX, Windows, Mac OS, or any other suitable operating system.

The illustrated server appliance 115 is communicably coupled with in-memory database 140 in the server system 105. In some embodiments, server 115 and/or certain of its components may be integrated with database 140 so that, for instance, processing (e.g., all or partial) may be performed directly on in-memory data with processing results passed (e.g., via a communication channel) directly to a client. In alternative embodiments, the in-memory database 140 may be located external to the server system 105 and communicably coupled to one or more of the server system 105 and/or client system 110 through the network 120. The illustrated in-memory database 140 may include integrated processing, i.e., all business and/or analytic operations done in processing memory. Moreover, content from business content sources (described more fully below) may be replicated from one or more transactional systems (e.g., coupled to the network 120) to the in-memory database 140 immediately. Thus, the in-memory database 140, in some aspects, may handle the analytical systems for all business data in real-time, as opposed to, for instance, computational processing systems that have separate transactional and analytical systems that connect through relational databases (i.e., relational databases stored on magnetic memory that require a process, e.g., ETL, to transfer data from one system to another not in real time but with a delay of an hour, day, week, or longer).

In some embodiments, the in-memory database 140 may expose business data and capabilities to improve an end-solution for end users (e.g., the client appliances 125). The in-memory database 140 may reside on top of a computational engine (e.g., in the server appliance 115 or otherwise) that facilitates fast manipulations on large amounts of business data and/or replication of entire business suite information. Thus, in some embodiments, the in-memory database may provide for the following design principles/concepts: business data in real-time (e.g., GUI patterns for constantly updated business data); well modeled tables and data cubes (e.g., in order to provide semantic services); a highly parallelized computational engine (e.g., for computationally intensive GUI patterns such as real time alerts and/or suggestions); close coupling of business logic and business data (e.g., eliminating indexing and caching); dynamic creation of relationships and target objects based on user roles (e.g., for gathering of social intelligence data from data models replicated in the in-memory database).

The illustrated in-memory database 140 stores one or more data objects 143. The data objects 143 may include and/or reference a variety of objects that store and/or include business data. For instance, the data objects 143 may be data cubes, such as OLAP (online analytical processing) cubes. The data cubes may consist of a data structure that allows for columnar data storage rather than, e.g., row data storage; different types of indices compared to relational databases; and in-memory technology as compared to data stored in relational databases. The data cube may also allow manipulation and/or analysis of the data stored in the cube from multiple perspectives, e.g., by dimensions, measures, and/or elements of the cube. A cube dimension defines a category of data stored in the cube, for example, a time duration of certain business data, a product or service, business user roles, and a variety of other categories. In other words, a cube dimension may be one way to slice business data stored in the cube according to some business logic (e.g., logic within and/or associated with the contextual workspace modules). In some instances, the data cube may have three-dimensions, but any number of dimensions may be designed into the cube (e.g., a hypercube).

A cube measure may be a fact, such as a numeric fact, that is categorized into one or more dimensions. Measures may include, for example, specific product sales data according to a set period of time. Measures may also include, for example, manufacturing efficiency data for a particular organizational unit of a business enterprise. In short, measures may include any appropriate business data that may be manipulated according to business logic to assist or support the business enterprise.

One or more functions may be performed on a data cube. For instance, the data cube may be pivoted, in various ways. Each pivot provides the business user with a distinct view of particular business data stored in the cube. For instance, in one view, a business user may be presented with sales data of a specific data within a particular geographic region across a particular time period with a particular focus on the sales vs. geography relationship. In another view, the same data (e.g., the same measures and elements) may be presented with a different focus, e.g., the sales vs. time period relationship. In some aspects, pivoting a data cube in real-time may allow the business user to more efficiently analyze the business data.

Other functions performable on data cubes may be, for instance, slice, dice, drill down/up, and roll-up. A slice operation identifies a subset of a multi-dimensional array corresponding to a single value for one or more members of the cube dimensions not in the subset. A dice operation is a slice operation on more than two dimensions of a data cube (or more than two consecutive slices). A drill down/up operation allows the business user to navigate the data cube's levels of data to reveal levels containing the most summarized (up) data to the most detailed (down) data. A roll-up operation involves computing all of the data relationships for one or more dimensions of the data cube.

The data objects 143 may include and/or store other forms of data along with or in place of data cubes. For example, the data objects 143 may represent, store, and/or reference data from one or more content sources, such as web content, feeds, REST services, business data repositories, reports, status updates, discussions, wikis, blogs, and other content sources. Of course, while illustrated as contained in the in-memory database 140, the data objects 143 may also be stored, for example, in one or both of the memories 155, in the remote computing system 130, and/or a separate repository communicably coupled to the network 120. In some embodiments, the data objects 143 may be stored in a raw, compiled, or compressed form or combination thereof.

The illustrated client system 110 includes one or more client appliances 125 having corresponding GUIs 127. Each client appliance 125 may be any computing device operable to connect to or communicate with at least the server system 105 and/or via the network 120 using a wireline or wireless connection. Further, as illustrated, each client appliance 125 includes a processor 150, an interface 145, and a memory 155. In general, each client appliance 125 comprises an electronic computer device operable to receive, transmit, process, and store any appropriate data associated with the environment 100 of FIG. 1. It will be understood that there may be any number of client appliances 125 associated with, or external to, environment 100. For example, while illustrated environment 100 illustrates three client appliances, alternative implementations of environment 100 may include a single client appliance 125 communicably coupled to the server system 105, or any other number suitable to the purposes of the environment 100.

Additionally, there may also be one or more additional client appliances 125 external to the illustrated portion of environment 100 that are capable of interacting with the environment 100 via the network 120. Further, the term "client" and "user" may be used interchangeably as appropriate without departing from the scope of this disclosure. Moreover, while each client appliance 125 is described in terms of being used by a single user, this disclosure contemplates that many users may use one computer, or that one user may use multiple computers. As used in this disclosure, client appliance 125 is intended to encompass a tablet computing device, personal computer, touch screen terminal, workstation, network computer, kiosk, wireless data port, smart phone, personal data assistant (PDA), one or more processors within these or other devices, or any other suitable processing device. For example, each client appliance 125 may comprise a computer that includes an input device, such as a keypad, touch screen, mouse, or other device that can accept user information, and an output device that conveys information associated with the operation of the server system 105 or the client appliance 125 itself, including digital data, visual information, any application, or the GUI 127. Both the input and output device may include fixed or removable storage media such as a magnetic storage media, CD-ROM, or other suitable media to both receive input from and provide output to users of the client appliances 125 through the display, namely, the GUI 127.

The illustrated network 120 facilitates wireless or wireline communications between the components of the environment 100 (i.e., between the server system 105 and the client system 110), as well as with any other local or remote computer (e.g., remote computing system 130), such as additional clients, servers, or other devices communicably coupled to network 120 but not illustrated in FIG. 1. The network 120 is illustrated as a single network in FIG. 1, but may be a continuous or discontinuous network without departing from the scope of this disclosure, so long as at least a portion of the network 120 may facilitate communications between senders and recipients. The network 120 may be all or a portion of an enterprise or secured network, while in another instance at least a portion of the network 120 may represent a connection to the Internet. In some instances, a portion of the network 120 may be a virtual private network (VPN), such as, for example, the connection between the client system 110 and the server system 105.

Further, all or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), cellular networks, all or a portion of the Internet, and/or any other communication system or systems at one or more locations.

The illustrated remote computing system 130 is communicably coupled to one or both of the server system 105 and client system 110 through the network 120. In some instances, as illustrated, the remote computing system 130 stores and/or references third party content 135, such as, for example, data objects, web content, electronic communications, content feeds, and other data sources. Although illustrated as a single appliance, the remote computing system 130 may include any number of appliances (e.g., servers, clients, mobile devices, and otherwise) coupled to the network 120 individually and/or in groups. For instance, in some embodiments, the remote computing system 130 may be a web content server delivering web content to one or more of the client appliances 125 in response to a request. In some embodiments, the remote computing system 130 may be a repository storing one or more data objects, such as data cubes or other form of database storing business data.

The illustrated communication interfaces 145 (shown as part of the server appliance 115 and the client appliance 125) facilitate communication among appliances in, for example, the client system 110, the remote computing system 130, and the server system 105. The interfaces 145 may also facilitate communication among the illustrated systems and other systems in a client-server or other distributed environment (including within environment 100) connected to the network. Generally, the interfaces 145 include logic encoded in software and/or hardware in a suitable combination and operable to communicate with the network 120. More specifically, the interfaces 145 may include software supporting one or more communication protocols associated with communications such that the network 120 or interface's hardware is operable to communicate physical signals within and outside of the illustrated environment 100.

The illustrated processors 150 (shown as part of the server appliance 115 and the client appliance 125) may be a central processing unit (CPU), a blade, an application specific integrated circuit (ASIC), a field-programmable gate array (FPGA), or another suitable component. Generally, the processors 150 execute instructions and manipulate data to perform the operations of the respective server appliance 115 and client appliance 125 and, specifically, the contextual workspace module (server) 160 and contextual workspace module (client) 165), and the graphical exploration module 180, as well as any other applications. Specifically, the server appliance's processor 150 executes the functionality required to receive and respond to requests from the client appliances 125 and their respective applications (e.g., contextual workspace (client) 165), as well as the functionality required to perform the other operations of the contextual workspace module (server) 160.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. Although illustrated as a single processor 150 for each of the respective server appliance 115 and client appliance 125 in FIG. 1, two or more processors may be used according to particular needs, desires, or particular embodiments of environment 100.

The illustrated memories 155 (shown as part of the server appliance 115 and the client appliance 125) may include any memory or database module and may take the form of volatile or non-volatile memory including, without limitation, magnetic media, optical media, random access memory (RAM), read-only memory (ROM), removable media, or any other suitable local or remote memory component. Each memory 155 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective server appliance 115 and client appliance 125. Additionally, each memory 155 may include any other appropriate data, such as VPN applications, firmware logs and policies, firewall policies, a security or access log, print or other reporting files, as well as others.

As illustrated, memory 155 of the server appliance 115 includes and/or stores one or more server content objects 170. Memory 155 of the client appliance 125 includes and/or stores one or more client content objects 175. In some embodiments, the server content objects 170 and/or the client content objects 175 may be similar to the data objects 143 stored in the in-memory database 140. For example, the content objects 170 and 175 may be data cubes, tables, reports, or other content sources, such as web content, electronic communications, feeds, and otherwise. Regardless of the form of the content objects 170 and 175, these objects may contain and/or reference business data on which business logic may be applied, e.g., by the contextual workspace module (server) 160 and/or contextual workspace module (client) 165, in order to realize and/or accomplish a task in a business environment.

The illustrated computing system 100 includes a contextual workspace module (server) 160, a contextual workspace module (client) 165, and a social networking module 180. At a high level, each of the contextual workspace module (server) 160 and contextual workspace module (client) 165 (referred to collectively as the contextual workspace modules), and the social networking module 180, is any application, program, module, process, or other software that may execute, change, delete, generate, or otherwise manage information according to the present disclosure, particularly in response to and in connection with one or more requests received from the illustrated client appliances 125 and their associated applications. In certain cases, only one contextual workspace module (server) 160 may be located at a particular server appliance 115. In others, a plurality of related and/or unrelated contextual workspace module (server) 160 may be stored at a single server appliance 115, or located across a plurality of other server appliances 115 in the server system 105, as well.

In certain cases, the contextual workspace modules and the social networking module 180 may be implemented as composite applications. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the contextual workspace modules may represent web-based applications accessed and executed by remote client appliances 125 or client applications via the network 120 (e.g., through the Internet).

Further, while illustrated as internal to server appliance 115, one or more processes associated with the contextual workspace module (server) 160 or the social networking module 180 may be stored, referenced, or executed remotely. For example, a portion of the contextual workspace module (server) 160 may be a web service associated with the application that is remotely called, while another portion of the contextual workspace module (server) 160 may be an interface object or agent bundled for processing at a remote client appliance 125 via the contextual workspace module (client) 165. Moreover, any or all of the contextual workspace modules or the social networking module 180 may be a child or sub-module of another software module or enterprise application (not illustrated) without departing from the scope of this disclosure.

As explained more fully below, one, all, or a combination of the contextual workspace modules 160 and 165, and the social networking module 180, may present or facilitate presentation of a user interface, e.g., through GUI 117 and/or GUI 127, to a business user to perform a variety of tasks. For instance, the contextual workspace modules 160 and 165 may present one or more workspace modules containing business data relevant to the business user in a variety of forms, e.g., tables, graphs, notes, and otherwise. The relevant business data may be sourced from, for example, the data objects 143 or other content sources. The social networking module 180 may search for potential relationships between data objects based on various attributes and present a graphical depiction of relationships between different data models (e.g., data cubes) or specific data objects, allowing a user to form additional relationships between the data objects.

Figure 2A:
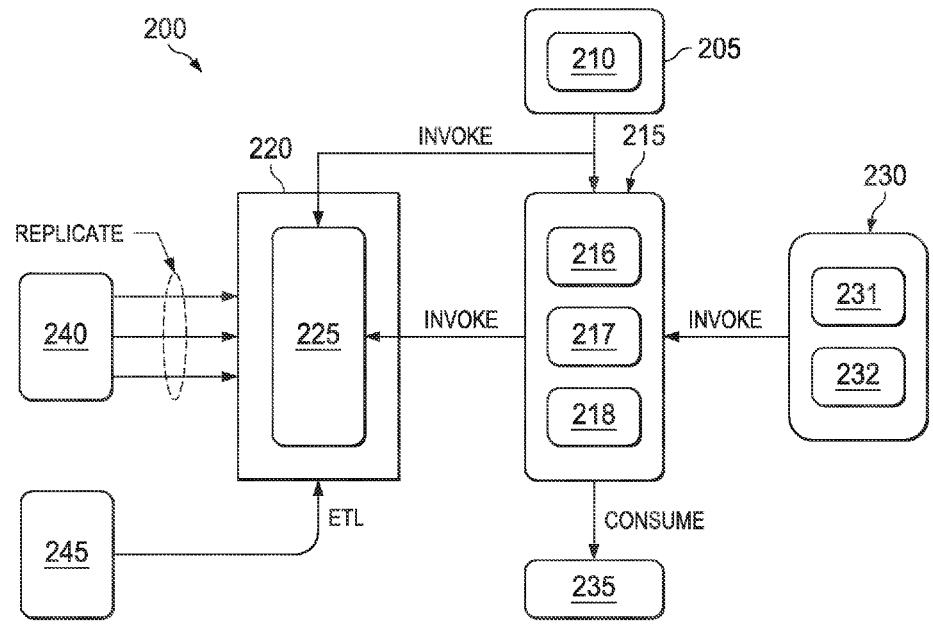
FIGS. 2A-2B illustrate additional example distributed computing systems operable to generate, view, modify, and/or otherwise provide exploration of social connections according to the present disclosure.
Figure 2B:
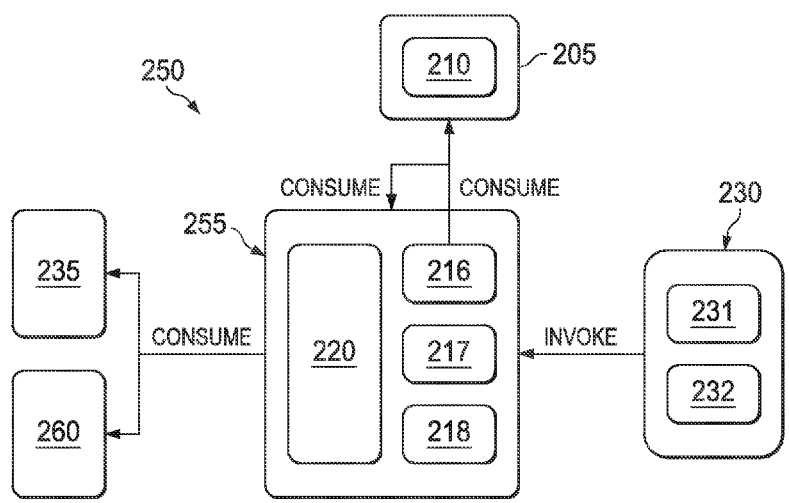

FIGS. 2A-2B illustrate additional example distributed computing systems 200 and 250, respectively, operable to generate, view, modify, and/or otherwise manipulate a contextual workspace. Distributed computing systems 200 and 250, in some embodiments, may illustrate two different example configurations for deployment of a contextual workspace within a distributed computing environment. For example, in some instances, either of the distributed computing systems 200 or 250 may represent an alternate deployment of a contextual workspace within a distributed computing environment to the computing system 100 shown in FIG. 1. The example configurations for distributed computing systems 200 and 250 can also be configured to provide for exploring social connections via data objects in an in-memory database, as described below in connection with FIGS. 4, 5, and 6. In particular, user interfaces provided in a contextual workspace can be enriched with new and alternative views on business data in real-time.

Turning to FIG. 2A, the illustrated distributed computing system 200 includes a web portal 205 communicably coupled to a virtual appliance 215 and an in-memory database 220. In some embodiments, the web portal 205 provides an authentication portal allowing a single point of access to applications, business data, and services both within and external to a business enterprise. For instance, an employee or user of the business enterprise may access the virtual appliance 215 and/or the in-memory database 220 via the web portal 205. In other words, the web portal 205 may provide a front end accessible through a client appliance located at the business enterprise.

The illustrated web portal 205 includes a client enterprise workspace 210. In some aspects, the client enterprise workspace 210 may be substantially similar to the contextual workspace module (client) 165 shown in FIG. 1. For instance, the client enterprise workspace 210 may present or facilitate presentation of a user interface (e.g., one or more workspace modules described more fully below) to the business user to perform a variety of tasks.

The illustrated virtual appliance 215 may be substantially similar to the server appliance 115 illustrated in FIG. 1 and include a server enterprise workspace 216, a business intelligence module 217, and an open source module 218. The server enterprise workspace 216, in some implementations, may be substantially similar to the contextual workspace module (server) 160 shown in FIG. 1. For instance, the server enterprise workspace 216 may provide for a customizable and dynamic virtual workspace accessible to a client and/or user via a GUI, e.g., through the web portal 205. In some aspects, as explained more fully below, such a virtual contextual workspace may provide for a number of functional features and advantages, such as, for instance, providing semantic context to relevant business data, providing suggestions to the user to add semantic and/or social data, and generating a number of ranked suggestions to add semantic data to the workspace according to social criteria.

The illustrated business intelligence module 217, at a high level, provides software and/or middleware services for performance analytics (e.g., supports organizational efforts to develop sophisticated visual representations of processes and performance, providing organizations with new insights that can help them make more informed decisions, assess and plan a business intelligence strategy, deploy dashboard tools, generate management and operational reports, and build an IT infrastructure that provides high scalability for users and data); services for analytic applications (e.g., provides guidance and deployment expertise in implementing analytic applications, offering pre-built analytics and data models to help a customer with a specific business problem in various industries, helping organizations to efficiently deploy applications); and introductory business intelligence services (e.g., introduces organizations to the dynamics of using business intelligence, providing the ability to leverage the functionality of business intelligence—such as executive dashboards and operational reports—without initiating a full-scale implementation).

The illustrated open source module 218, in some embodiments, may be an open source web application framework, such as, for example, a Rails (or RoR) for the Ruby programming language. In some embodiments, the module 218 may provide generic services like authentication, authorization, repository, logging, and otherwise.

The illustrated virtual appliance 215 is communicably coupled to a business object repository 235 in order to consume (e.g., retrieve, modify, manipulate or otherwise) business objects relevant to the business enterprise. Each business object stored on the repository 235, for example, a capsule with an internal hierarchical structure, behavior offered by its operations, and integrity constraints. In general, the overall structure of the business object model ensures the consistency of the interfaces that are derived from the business object model. The derivation helps ensure that the same business-related subject matter or concept can be represented and structured in the same way in various interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Business objects are generally semantically disjointed, i.e., the same business information is represented once. In some embodiments, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

A business object may be defined such that it contains multiple layers. Typical business objects may contain four layers: a kernel layer, an integrity layer, an interface layer, and an access layer. The innermost layer of the example business object is the kernel layer. The kernel layer represents the business object's inherent data, containing various attributes of the defined business object. The second layer represents the integrity layer. The integrity layer contains the business logic of the object. Such logic may include business rules for consistent embedding in a computing environment and the constraints regarding the values and domains that apply to the business object. Business logic may comprise statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object. The third layer, the interface layer, may supply the valid options for accessing the business object and describe the implementation, structure, and interface of the business object to the outside world. To do so, the interface layer may contain methods, input event controls, and output events. The fourth and outermost layer of the business object is the access layer. The access layer defines the technologies that may be used for external access to the business object's data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects of this embodiment may implement standard object-oriented technologies such as encapsulation, inheritance, and/or polymorphism.

The illustrated system 200 includes the in-memory database 220 communicably coupled to the web portal 205 and the virtual appliance 215. For example, as illustrated, the in-memory database 220 may be invoked by either or both of the web portal 205 and the virtual appliance 215. The in-memory database 220 may be substantially similar to the in-memory database 140 described in FIG. 1. Further, the in-memory database 220 includes in-memory business logic 225 (which, as illustrated, may be invoked by either or both of the web portal 205 and the virtual appliance 215). The in-memory business logic 225 may include a combination of one or more of software, middleware, and hardware (or other logic) operable to manipulate one or more data objects (e.g., stored in-memory on the database 220). For instance, the in-memory business logic 225 may perform functionality associated with and/or used by the enterprise workspace (client) 210 and/or enterprise workspace (server) 216, such as the methods described with reference to FIGS. 4-6, as well as other functionality disclosed herein.

The illustrated in-memory database 220 is communicably coupled to a business suite 240. In some embodiments, as described above, complete or partial processing may be done directly on a database, thus rendering making components like the "database," "server," and/or "suite" substantially similar or identical. At a high level, the business suite 240 may consist of one or more integrated enterprise applications enabling, e.g., business enterprises, to execute and optimize business and IT strategies, such as performing industry-specific, and business-support processes. In some embodiments, the business suite 240 may be built on an open, service-oriented architecture (SOA). Such integrated business applications may be replicated, for example, via the web portal 205 through the in-memory database 220, such as via the enterprise workspace (client) 210.

The illustrated in-memory database 220 is also communicably coupled to third party content 245. The third party content 245, for example, may be substantially similar to data stored and/or referenced by the remote computing system 135 described with reference to FIG. 1, such as, for example, the third party content 135. In some aspects, the third party content 245 may be stored and/or accessed through relational databases (i.e., relational databases stored on magnetic memory that require a process, e.g., ETL, to transfer data from one system to another not in real time but with a delay of an hour, day, week, or longer). For instance, while some business data may be stored on the in memory database 220 and therefore, be accessible in real-time, some business data may be available to and/or exposed by the in-memory business logic 225, such as the third party content 245.

The illustrated system 200 also includes one or more clients 230. For instance, as illustrates, the clients 230 may include a mobile client 231, and a web workspace 232. One or more of the clients 230 may invoke, for example, the enterprise workspace (server) 216, on the virtual appliance 215 in order to access and/or expose the functionality of the in-memory business logic 220. For example, the mobile client 231 may facilitate invocation of the enterprise workspace (server) 216 from a mobile device (e.g., cell phone, smart phone, email mobile device, PDA, or other mobile device). The web workspace 232 may, for instance, facilitate invocation of the enterprise workspace (server) 216 through a network connection, such as the global network known as the world wide web.

Turning to FIG. 2B, the illustrated distributed computing system 250 includes the web portal 205 communicably coupled to an in-memory application server 255, which, in turn, is communicably coupled to the clients 230, the business object repository 235, and a business financial management module 260. Accordingly, as illustrated, the distributed computing system 250 may provide for an alternative deployment configuration of a system operable to generate, view, modify, and/or otherwise manipulate a contextual workspace, as compared to the system 200, but with similar (or identical) components in some respect. For example, as illustrated, the in-memory application server 255 in system 250 may replace the virtual appliance 215/in-memory database 220 shown in FIG. 1. The in-memory application server 255, as illustrated, includes the in-memory database 220 (including, for example, the in-memory business logic 225, not shown here). The in-memory application server 255, as illustrated, also includes the server enterprise workspace 216, the business intelligence module 217, and the open source module 218.

The illustrated business financial management module 260, generally, supports IT services costing, customer value analysis, cost to serve, bill of material costing, and activity based costing, among other financial metrics. In some implementations, for example, the business financial management module 260 may provide for user-friendly, rapid, and efficient model building; accurate calculation and cross-charge for IT and other shared services; monitoring and manage costs, pricing, and true profitability; accurate assignment of overheads and indirect costs to customers, products, and channels; access to cost and profitability data by customer, product, or business channel; accurate assignment, monitoring, and analysis of overhead costs tied to bill of materials, among other functions.

FIG. 3 illustrates an example virtual distributed computing architecture 300 operable to generate, view, modify, and/or otherwise manipulate a contextual workspace. In some implementations, the example virtual distributed computing architecture 300 is also operable to search for potential relationships between data objects based on attributes associated with user profiles, and to enrich a user interface presented in the contextual workspace by generating graphical representation of potential relationships between data objects and models that were not previously defined in existing data models, and generating new relationships based on user selection of the graphical representations. As illustrated, the virtual distributed computing architecture 300 includes a web client 302, a web server 340, an in-memory computing engine 356, one or more external services 370, one or more consumption channels 372, one or more external content providers 374, and one or more data sources 376. As further illustrated, the web client 302, the web server 340, the in-memory computing engine 356, the one or more external services 370, the one or more consumption channels 372, the one or more external content providers 374, and/or the one or more data sources 376 may be communicably coupled through an HTTP and/or REST architecture.

The illustrated web client 302 includes a UI module 304, a connectivity module 306, and a context module 308. The illustrated UI module 304, in some embodiments, may generate, modify, and/or maintain a virtual contextual workspace and present the workspace to a user through a GUI. The UI module 304 includes a workspace manager 310, a module gallery 312, a layout manager 314, a data orchestrator 316, a contextual assistance module 318, a global filtering module 322, a data streaming module 324, and a timeline module 326. The illustrated workspace manager 310, in some embodiments, may include functionality that manages operation and use of the contextual workspace by the user.

The illustrated module gallery 312, in some embodiments, may keep track of one or more workspace modules viewable on and/or available to a contextual workspace presented to the user. For example, the module gallery 312 may include an index (e.g., stored in a repository) of the current workspace modules being viewed by the user in the contextual workspace.

The illustrated layout manager 314, in some embodiments, may determine how one or more selected and/or requested workspace modules may be arranged on the contextual workspace. For example, the layout manager 314 may determine a size and/or placement of each module on the contextual workspace in order to, for instance, better manage the contextual workspace in the GUI presented to the user.

The illustrated data orchestrator 316, in some embodiments, may determine, for example, one or more available views and/or functionality available to the user with respect to a data cube (e.g., an OLAP cube storing business data exposable to the user). For example, the data orchestrator 316 may determine how to present or show any data model, including a data cube, to the user (e.g., icon, full screen, or something in between). In some embodiments, for example, the data orchestrator 316 may function along with other components of the illustrated architecture (e.g., the workspace manager 310, the module gallery 312, the layout manager 314, and other components) to perform the functionality described in FIGS. 4-6, as well as other processes and methods described herein.

The illustrated contextual assistance module 318, in some embodiments, may include functionality that provides the user of the contextual workspace generated by the architecture 300 with additional business data contextually relevant with business data being currently viewed in the workspace. For instance, the contextual assistance module 318 (or other modules included in the illustrated architecture 300) may identify semantically related information to that currently viewed on the contextual workspace by the user. The semantically related information may be suggested to the user, for example, to add to the contextual workspace through one or more workspace modules.

The illustrated global filtering module 320, in some embodiments, may provide for functionality that, for example, ranks and/or filters various suggestions for content (e.g., semantically related content or socially related content) to be added to the user's contextual workspace through architecture 300. For instance, the global filtering module 320 (or other modules included in the illustrated architecture 300) may rank suggestions to add semantically related data to the user's contextual workspace according to one or more social metrics.

The illustrated data annotations module 322, in some embodiments, may provide for functionality that, for example, allows a user to generate notes (or other annotations) that provide specific context to data within one or more workspace modules in the contextual workspace. For instance the data annotations module 322 may, in some aspects, allow the user to dynamically create and/or view insights (e.g., notes or other annotations) on contexts of data within the contextual workspace. The insights could be for the user or other users (e.g., a collaboration).

The illustrated data streaming module 324, in some embodiments, may manage, direct, and/or control the transfer of data (e.g., from data objects, data cubes, documents, reports, feeds, and other data sources) to, for example, the web client 302. For instance, the data streaming module 324 may manage the speed at which data is transferred to the web client 302 to, for example, expose on one or more workspace modules of the contextual workspace generated and presented to the user.

The illustrated timeline module 326, in some embodiments, may provide for functionality that allows a user to "time travel" through one or more previous views of a contextual workspace. For instance, in some embodiments, each distinct contextual workspace (i.e., each view with a distinct set, combination, and/or number of workspace modules included within the contextual workspace) may be time stamped with a particular time (e.g., hour/minute/day, date, week, month, or other granularity). The time stamp may be part of the metadata of the contextual workspace generated by and presented to the user. In some aspects, the user may "time travel" back in time to view previous versions of the contextual workspace according to the time stamp. Thus, not only the data contained in the contextual workspace, but the user's subjective view on the data (e.g., which workspace modules were selected) can be retrieved. The user may filter the contextual workspace versions by the time stamp, data exposed in the contextual workspaces, keywords, and/or other metrics.

The illustrated connectivity module 306 includes, in some embodiments, context sources module 328 and a content fetching module 330, and, in some aspects, may provide connection functionality for the web client 302 to communicate with, for example, the web server 340, the in-memory computing engine 356, the data sources 376, and/or other content repositories or sources. The illustrated context sources module 328, in some embodiments, may provide for functionality to the web client 302 to connect to various sources of contextually relevant (e.g., semantically relevant) data related to one or more workspace modules in the contextual workspace. For example, semantically relevant data may be exposed from, for example, data objects, data cubes, documents, search functions, social data (e.g., people), and other sources.

The illustrated content fetching module 330, in some embodiments, may provide functionality to retrieve and/or gather data content from one or more data sources, such as, for example, data objects, data cubes, documents, search functions, social data (e.g., people), and other sources.

The illustrated context module 308 includes, in some embodiments, a context discovery module 332, a suggestions and rankings module 334, an events and alerts module 336, and a context model 338. In some aspects, the context module 308 may provide functionality related to discovering and/or suggesting semantically relevant data (e.g., from data objects, data cubes, and otherwise) related to data being viewed by the user on the contextual workspace. The illustrated context discovery module 332, in some embodiments, may provide functionality related to searching for and/or exposing semantically relevant content related to data on the contextual workspace, e.g., in one or more workspace modules. For example, semantically relevant data may include information related to data that the user works with or views in the contextual workspace and/or arranges (according to his/her expertise) within the contextual workspace. For instance, the arrangement of data (e.g., which workspace modules are selected and/or viewed) may provide at least a portion of the overall context of the workspace apart from the data (numerical or otherwise). The semantically relevant data may be related, e.g., according to keywords, metadata, cube dimensions, cube measures, cube views, table headings, etc., which may be unknown to the user (due to, for instance, the vast amount of data available to the user).

The illustrated suggestions and rankings module 334, in some embodiments, may include functionality that provides suggestions of semantically relevant data to the user to add to the contextual workspace. The suggestions and rankings module 334 may also include functionality that ranks a number of suggestions of semantically relevant data according to, for example, matching keywords, matching metadata, social metrics, and/or other criteria.

The illustrated events and alerts module 336, in some embodiments, may include functionality that allows the user set an alert, e.g., at a given point of time when a particular event is occurring. The user, therefore, may be reminded (at a later time) of how that particular problem was resolved. In some aspects, the events and alerts module 336 may also provide a user with notification (via one or more workspace modules of the contextual workspace) of events and/or alerts based on, for instance, actions of other users with similar roles within the business enterprise (e.g., within the same organization unit, or having the same title).

The illustrated context model 338, in some embodiments, may build and/or generate a model (e.g., a context bag) containing the discovered semantically relevant data related to the contextual workspace data exposed in one or more workspace modules.

The illustrated web server 340 includes a workspace services module 342. The illustrated workspace services module 342 includes a content provider manager 344, a workspace data manager 346, a context data manager 348, a contextual services manager 350, and a data acquisition and modeling module 354. The illustrated content provider manager 344 and the illustrated workspace data manager 346, in some embodiments, may direct, control, and/or otherwise manage the content and data exposed on the one or more workspace modules in the contextual workspace.

The illustrated context data manager 348, in some embodiments, may direct, control, and/or otherwise manage semantically relevant content (e.g., determined according to, for example, metadata contained in the workspace modules on the contextual workspace). In some embodiments, the illustrated contextual services manager 350 may include functionality that assists (at least partially) the context data manager 348 in directing, controlling, and/or otherwise managing semantically relevant.

The illustrated data acquisition and modeling module 354, in some embodiments, may perform modeling functionality on business data to be exposed in one or more workspace modules in the contextual workspace. For instance, the data acquisition and modeling module 354 may model data objects, such as data cubes, as three-dimensional workspace modules in the contextual workspace. In some implementations, the data acquisition and modeling module 354 may render three-dimensional graphical views on data cubes and other data objects to allow graphical exploration of business data in an in-memory database. In certain instances, the data acquisition and modeling module 354 may render graphical depictions of potential relationships between relevant data or socially relevant data to add to existing models of data objects, as described below in relation to FIGS. 4-6.

The illustrated in-memory computing engine 356 includes a social suggestions module 358, a semantic suggestions module 360, an alert engine 362, a data annotations module 364, a context database 366, and a business suite database 368. In some embodiments, the social suggestions module 358 may, in some embodiments, include functionality that provides suggestions of socially relevant data to the user to add to the contextual workspace. For instance, the suggestions may include business data that other users (e.g., other business users in the same organizational unit of the enterprise, same team of the user, or same role of the user, to name a few) found relevant and/or useful. The suggested business data may also be contextually relevant to one or more workspace modules active in the user's contextual workspace.

The illustrated semantic suggestions module 360, in some embodiments, include functionality that provides suggestions of semantically relevant data to the user to add to the contextual workspace. For instance, the suggestions may include business data that has some related contextual similarity with data exposed in one or more workspace modules in the user's contextual workspace. For example, the semantically relevant data may be business data from a data cube having one or more similar dimensions and/or measures as compared to a data cube currently being viewed and/or analyzed in the contextual workspace. As another example, the semantically relevant data may be business data from a table having a similar heading to a table currently being viewed in the contextual workspace. Thus, the suggested semantically relevant data may be business data that provides insight to the user that the business user would not have known about otherwise.

The illustrated alert engine 362, in some embodiments, in some embodiments, may include functionality that allows the user set an alert, e.g., at a given point of time when a particular event is occurring. The user, therefore, may be reminded (at a later time) of how that particular problem was resolved. In some aspects, the alert engine 362 may also provide a user with notification (via one or more workspace modules of the contextual workspace) of alerts based on, for instance, actions of other users with similar roles within the business enterprise (e.g., within the same organization unit, or having the same title).

The illustrated data annotations module 364, in some embodiments, may provide for functionality that, for example, allows a user to generate notes (or other annotations) that provide specific context to data within one or more workspace modules in the contextual workspace. For instance the data annotations module 364 may, in some aspects, allow the user to dynamically create and/or view insights (e.g., notes or other annotations) on contexts of data within the contextual workspace. The insights could be for the user or other users (e.g., a collaboration).

The illustrated context database 366, in some embodiments, may store and/or reference one or more contextually relevant data objects, such as data objects that have been determined (e.g., by one or more components of the architecture 300 such as the social suggestions module 358, the semantic suggestions module 360, or other component) to be socially and/or semantically relevant based on one or more workspace modules in the contextual workspace. For example, the context database 366 may store and/or reference one or more data cubes, reports, documents, business objects, or other data objects. In some embodiments, the context database 366 may also store and/or reference one or more suggestions (e.g., social, semantic, or otherwise) generated by the architecture 300.

The illustrated business suite database 368, in some embodiments, may store and/or reference business data, such as business data utilized by the business suite app 374a.

The illustrated external services 370 include an event insight 370a, social intelligence 370b, text analysis 370c, and feed services 370d. Generally, the illustrated external services 370 may provide business data (e.g., semantically and/or socially relevant business data) to at least one of the web client 302, the web server 340, and/or in-memory computing engine 356. For instance, the illustrated event insight 370a, in some embodiments, may provide alerts to the web client 302 and/or web server 340 to present to the business user through one or more workspace modules of the contextual workspace. The illustrated social intelligence 370b, in some embodiments, may provide social business data (e.g., social connections between one or more business users in a business enterprise) to the web client 302 and/or web server 340 to present to the business user through one or more workspace modules of the contextual workspace. For example, the social business data may be a graph and/or chart showing business connections between employees, such as, for instance, a degree of connection between the employees (e.g., through one or more known business contacts). The illustrated text analysis 370c, in some embodiments, may identify business data located in documents or other data objects through, for instance, a keyword search or metadata search of the text in the documents. The illustrated feed services 370d, in some embodiments, may provide business data through one or more web feeds to the web client 302 and/or web server 340 (e.g., RSS feeds).

The illustrated consumption channels 372 include a mobile channel 372a and one or more feed clients 372c. Typically, the consumption channels 372 may also provide business data (e.g., semantically and/or socially relevant business data) to at least one of the web client 302, the web server 340, and/or in-memory computing engine 356. For instance, the illustrated mobile channel 372a, in some embodiments, may provide business to the web client 302 and/or web server 340 from one or more mobile channels to present to the business user through one or more workspace modules of the contextual workspace.

The illustrated feed clients 372c, in some embodiments, may include, for example, a mail client, which may provide business data to at least one of the web client 302, the web server 340, and/or in-memory computing engine 356 through one or more electronic communications.

The illustrated external content providers 374 include one or more UI applications, such as a business suite app 374a, a business intelligence app 374b, and a social gadget app 374c. Typically, the external content providers 374 provide for a number of UI applications that may be interfaced by a user, e.g., through the web client 302 or otherwise. The business suite app 374a, for example, may be business applications that provide integration of information and processes, collaboration, industry-specific functionality, and scalability. For instance, the business suite app 374a may include one or more constituents, such as CRM (Customer Relationship Management), ERP (Enterprise Resource Planning), PLM (Product Lifecycle Management), SCM (Supply Chain Management), and/or SRM (Supplier Relationship Management). The business intelligence app 374b, for example, may provide for a UI application that may be used in identifying and extracting business data (e.g., ETL) and analyzing such business data. The business data may include, for example, sales revenue, profits, and/or costs broken down by products and/or departments. In some aspects, the business intelligence app 374b may provide for historical, current, and/or predictive views of business operations, such as reporting, online analytical processing, analytics, data mining, process mining, business performance management, benchmarking, text mining, and/or predictive analytics. In some aspects, the business intelligence app 374b may also provide for layers including an ETL layer (e.g., responsible for extracting data from a specific source, applying transformation rules, and loading it into a data warehouse); the data warehouse (e.g., responsible for storing the information in various types of structures); reporting (e.g., responsible for accessing the information in the data warehouse and presenting it in a user-friendly manner to the business user); and a planning and analysis layer (e.g., provides capabilities for the user to run simulations and perform tasks such as budget calculations). The illustrated social gadget app 374c, for example, may include games, social news feeds and other UI apps.

The illustrated data sources 376 include an in-memory database 376a, a gateway 376b, one or more feeds 376c, and one or more documents 376d. Typically, the data sources 376 may provide data, such as business data, to the illustrated web client 302 and/or web server 340 that may be manipulated to, for instance, provide suggestions of additional contextual data, provide suggestions of semantically-related data, and/or provide other suggestions, alerts, or events. For example, the in-memory database 376a may store and/or reference one or more data cubes containing business data. The gateway 376b may, for example, be a front-end server to the business suite app 374 and expose business suite services in an open protocol format. The feeds 376c, for instance, may provide business and/or social data through social updates, for example, Twitter, Facebook, RSS feed/channels, and/or other feed sources or channels. The documents 376*d*, for instance, may be any number of documents stored in or referenced by a document store (i.e., in a relational database or otherwise).

Figure 4:
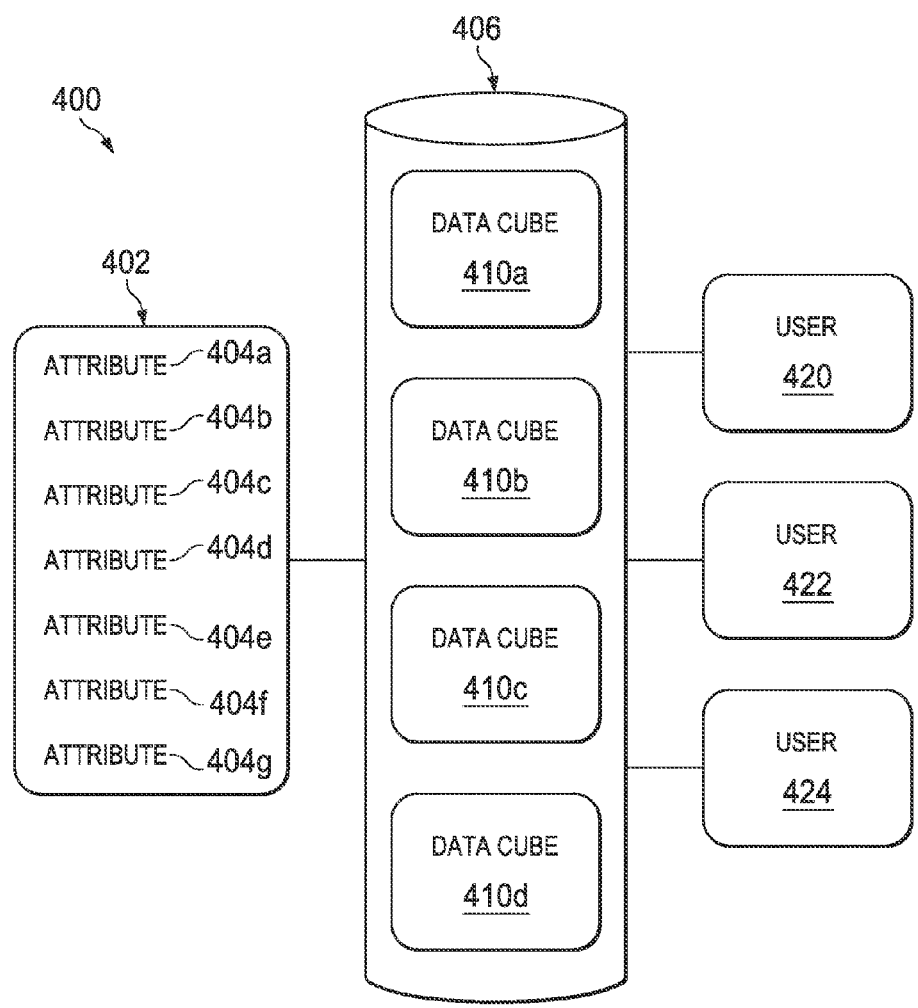
FIG. 4 illustrates an example block diagram depicting exploration of social connections by searching data objects in an in-memory database according to the present disclosure.

FIG. 4 illustrates a block diagram 400 of social networking using existing data objects in an in-memory database 406. The social networking module 180 may identify a user profile 402 associated with a particular user. The user profile 402 may include a number of attributes 404*a*-*g*. In some implementations, a user can manage the user's own profile, including adding data or managing profile settings. The user may also be allowed to manage the privacy of profile data with varying degrees of exposure, which may affect the information returned during searches on the in-memory database 406.

The social networking module 180 may identify potential relationships with other users 420, 422, or 424 based on some of the attributes 404*a*-*g* in the user profile 402. For example, in some implementations, the social networking module 180 may search existing data objects in an in-memory database 406 using a particular one of the attributes found in the user profile 402. The search may be based on a query received from a user who is looking for possible social connections to the user associated with user profile 402. In certain instances, the social networking module 180 searches existing data cubes 410*a*-*d* in the in-memory database 406. The data cubes 410*a*-*d* may represent data models or views on business data, business processes, or other organizational data. In some instances, the data in the in-memory database 406 is loaded by users or extracted from existing sources by an administrator and transformed to map into certain data structures. Further, changes to the data cubes 410*a*-*d* may automatically be replicated in the in-memory database 406. Accordingly, the social networking module 180 may quickly search existing, updated, and readily accessible data models (e.g., data cubes 410*a*-*d*) for instances where there may be a relationship between users based on one or more attributes.

For example, one of the attributes in the user profile 402 may be a current project that the user of profile 402 is working on. The social networking module 180 may execute a query containing a project identification label to search the in-memory database for information regarding the current project. One or more of the data cubes in the in-memory database 406 may include information regarding other members (e.g., user 420) involved in the current project, supervisors of the other members, or location of the other members, for example. This information may be presented to a user to allow the user to perform additional searches to identify additional users (e.g., users 422 and 424) based on other attributes, or to allow the user to perform actions associated with the identified member, user 420, of the current project. In some instances, the actions may include sending e-mail or invitations to user 420, or to export data to user 420.

Figure 5:
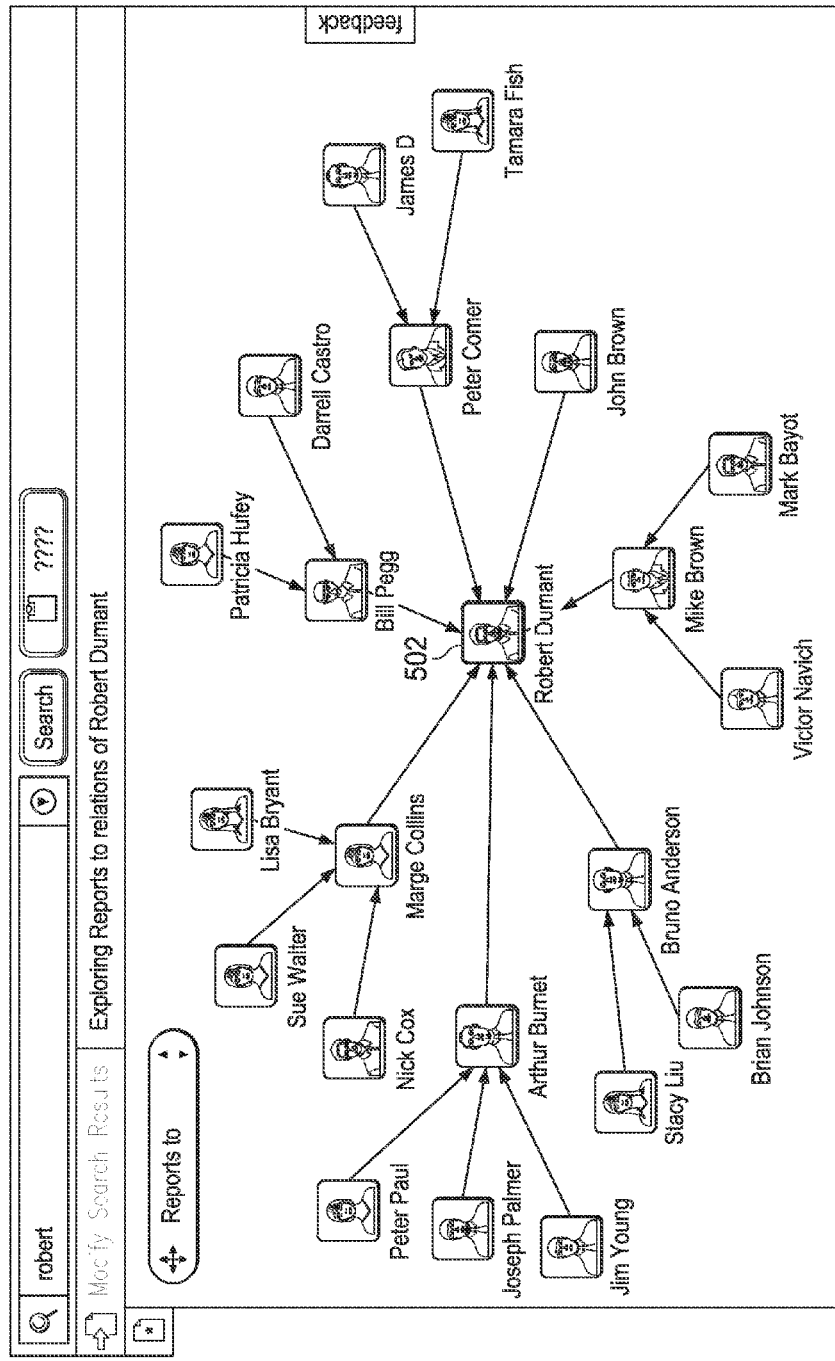
FIG. 5 illustrates an example screenshot of social connections identified through searching data objects in an in-memory database according to the present disclosure.

In some implementations, the information returned from the searches performed by the social networking module 180 may be presented graphically to a user to allow a user to explore relationships identified by the social networking module 180. FIG. 5 illustrates an example screenshot 500 of a graphical presentation of a social network. The user may select certain presented graphical objects to view additional detail regarding other users or relationships, perform actions associated with other user profiles, or explore relationships exposed during the search. For example, a user may be presented with options allowing the user to view relationships defining project opportunities of a particular user 502, such as projects being worked on by a particular user 502, other users working on the same project, past projects, the supervisor(s) of the particular user 502, or other users in the same office.

The user may explore the presented information and further explore relationships between people, projects, or entities. In an initial search of data cubes in the in-memory database 406, a first set of relationships with the particular user 502 may be identified and presented, as illustrated in FIG. 5. A user, however, may explore additional relationships, data objects, or users based on the results from the initial search.

In certain instances, if the underlying business data (i.e., data cubes, data objects, etc.) upon which the relationships, profile data, graphical objects, and various social networking options are based is accessed through an in-memory database 406, the social networking exploration options presented to the user are automatically and quickly updated with the most recent changes to the data. Accordingly, the total cost of ownership is minimized because the data sources are already loaded into the in-memory database 406, obviating the need in some instances for a dedicated extract, transform, and load (ETL) process for data in a database. Further, the social networking module 180 may perform direct queries on the in-memory database instead of scheduling tasks to update data, configure data mappings, or index data for search results. The social networking module 180 may also aggregate user profile data dynamically by aggregating data from different sources in the in-memory database 406.

Figure 6:
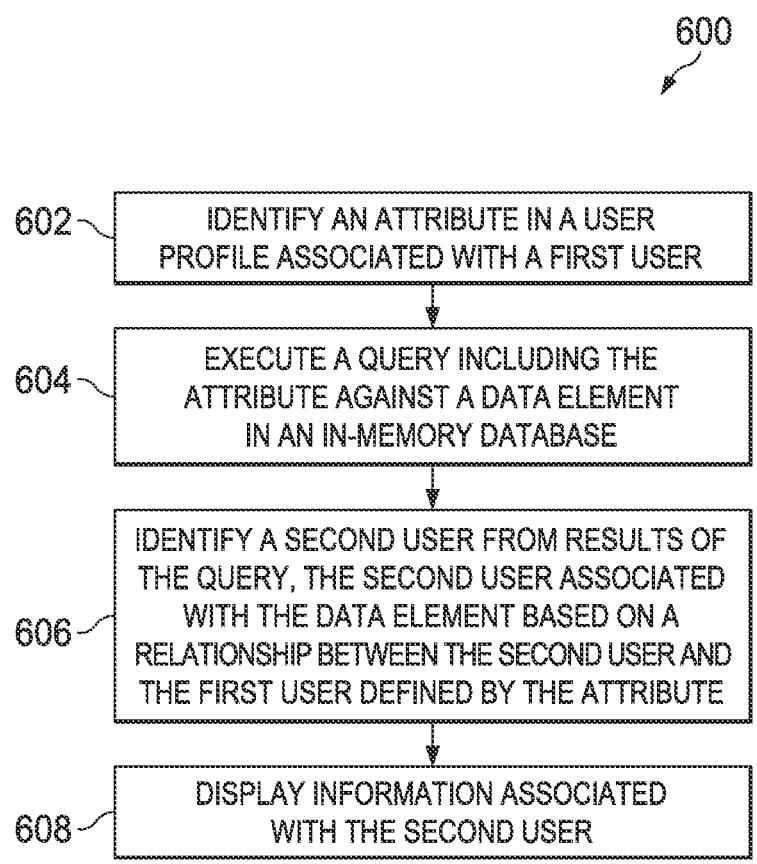
FIG. 6 illustrates an example process for exploring social connections through searching data objects in an in-memory database according to the present disclosure.

FIG. 6 illustrates an example process 600 for providing graphical exploration of an in-memory database. In the present example, process 600 may be performed by the social networking module 180. First, the social networking module 180 identifies an attribute in a user profile associated with a first user at 602. In some instances, a selection of the attribute is received from a user, which may be the first user or a different user, in order to determine if there are potential social connections with other users based on the selected attribute. The social networking module 180 executes a query including the attribute against a data element in an in-memory database at 604. In certain implementations, the data element may be an existing data cube in the in-memory database. Accordingly, an ETL process may not be needed to extract and process the data when searching for social connections based on the attribute. Instead, the query may be executed directly against the data cube in the in-memory database, allowing up-to-date, "real-time" determination of potential social connections.

The social networking module 180 identifies a second user from results of the query, the second user associated with the data element based on a relationship between the second user and the first user defined by the attribute at 606. For example, the attribute identified in the user profile of the first user may be a current project that the first user is a member of. The query executed against the data element in the in-memory database may include the name of the current project, and the query results may include, among other information, a list of other members of the current project, including the second user. The social networking module 180 may identify the second user based on the relationship in which the first user and the second user are members of the same project. The information associated with the second user may be displayed at 608. In certain instances, various options may also be presented, allowing a user to perform actions associated with the second user, such as sending a communication to the second user or performing additional searches for other potential social connections based on attributes found in a user profile of the second user.

A number of implementations have been described. Nevertheless, it will be understood that various modifications may be made. For example, other methods described herein besides those or in addition to those illustrated in FIG. 6 may be performed. Further, the illustrated steps of method 600 may be performed in a different order, either concurrently or serially. Further, steps may be performed in addition to those illustrated in method 600, and some steps illustrated in method 600 may be omitted without deviating from the present disclosure. Accordingly, other implementations are within the scope of the following claims.

What is claimed is:

1. A computer-implemented method performed with a computing system for exploring social connections in an in-memory database, the method comprising:
   identifying a user profile associated with a first user, the user profile associated with a computer-implemented social networking service;
   identifying a first change to a first data object stored and provided by a first data system as the first change occurs and a second change to a second data object stored and provided by a second data system as the second change occurs, wherein the first and the second data objects are associated with one or more attributes of the user profile, the first and the second data systems both stored in the in-memory database;
   aggregating, in real-time, data representative of the first change as the first change occurs within the first data system and representative of the second change as the second change occurs within the second data system to update, in real-time, the user profile;
   providing, based on the aggregated data, a permission model associated with the computer-implemented social networking service;
   identifying a change to the permission model, and in response, updating the in-memory database in real-time;
   identifying a particular attribute of the one or more attributes in the updated user profile that is associated with the first user and related to a current project of the first user, the particular attribute comprising a role of the first user within a business enterprise associated with one or more enterprise projects, enterprise expertise, or enterprise working groups;
   executing a query against a data element stored in an in-memory database, the query including the particular attribute in the updated user profile and an identification of the current project;
   identifying a second user from results of the query, the second user associated with the data element based on a relationship between the second user and the first user defined by the particular attribute and the current project; and
   generating displayable information associated with the second user.

2. The method of claim 1, wherein the data element is a data cube.

3. The method of claim 1 further comprising performing at least one of:
   presenting an interface operable to allow the first user to email the second user;
   presenting an interface operable to allow the first user to send an invitation to the second user;
   presenting an interface operable to allow the first user to export information to the second user; or
   presenting an interface to allow additional searches of data elements in the in-memory database based on the information associated with the second user.

4. The method of claim 1, wherein the information associated with the second user includes a user profile of the second user.

5. The method of claim 1, further comprising:
   identifying a change to the data element; and
   updating the displayable information associated with the second user based on the change to the data element.

6. The method of claim 1, wherein the query is executed against a plurality of data elements in the in-memory database, wherein at least two of the plurality of data elements are from different data sources in the in-memory database, and
   prior to executing the query against the data element stored in the in-memory database, the different data sources are replicated to the in-memory database from one or more enterprise systems communicably coupled to the in-memory database.

7. The method of claim 6, wherein executing a query against a data element stored in an in-memory database comprises executing a query against a data element stored in an in-memory database with an in-memory computational engine in the in-memory database.

8. The method of claim 1, further comprising:
   identifying a plurality of additional users from results of the query, the additional users associated with the data element based on a relationship between each of the additional users and the first user defined by the particular attribute; and
   dynamically generating a graphical network representing the first user, the plurality of additional users, and the relationship between each of the additional users and the first user defined by the particular attribute, where the first user and the plurality of additional users are represented as nodes in the graphical network and the relationship between each of the additional users and the first user defined by the particular attribute are represented as connections between nodes.

9. The method of claim 1, wherein the first and the second data systems includes one or more of a human capital management (HCM) system, a customer relationship management (CRM) system, and a supplier relationship management (SRM) system.

10. The method of claim 1, wherein the in-memory database includes integrated processing capabilities.

11. An apparatus comprising instructions embodied on a tangible, non-transitory computer-readable media, the instructions operable when executed to cause a computing system to perform operations comprising:
    identifying a user profile associated with a first user, the user profile associated with a computer-implemented social networking service;
    identifying a first change to a first data object stored and provided by a first data system as the first change occurs and a second change to a second data object stored and provided by a second data system as the second change occurs, wherein the first and the second data objects are associated with one or more attributes of the user profile, the first and the second data systems both stored in the in-memory database;
    aggregating, in real-time, data representative of the first change as the first change occurs within the first data system and representative of the second change as the second change occurs within the second data system to update, in real-time, the user profile;
    providing, based on the aggregated data, a permission model associated with the computer-implemented social networking service;
    identifying a change to the permission model, and in response, updating the in-memory database in real-time;
    identifying a particular attribute of the one or more attributes in the updated user profile that is associated with the first user and related to a current project of the first user, the particular attribute comprising a role of the first user within a business enterprise associated with one or more enterprise projects, enterprise expertise, or enterprise working groups;

executing a query against a data element stored in an in-memory database, the query including the particular attribute in the updated user profile and an identification of the current project;

identifying a second user from results of the query, the second user associated with the data element based on a relationship between the second user and the first user defined by the particular attribute and the current project; and generating displayable information associated with the second user.

12. The apparatus of claim 11, wherein the data element is a data cube.

13. The apparatus of claim 11, wherein the operations further comprise performing at least one of:

presenting an interface operable to allow the first user to email the second user;

presenting an interface operable to allow the first user to send an invitation to the second user;

presenting an interface operable to allow the first user to export information to the second user; or presenting an interface to allow additional searches of data elements in the in-memory database based on the information associated with the second user.

14. The apparatus of claim 11, wherein the particular attribute is related to a current project of the first user.

15. The apparatus of claim 11, wherein the operations further comprise:

identifying a change to the data element; and updating the displayable information associated with the second user based on the change to the data element.

16. The apparatus of claim 11, wherein the query is executed against a plurality of data elements in the in-memory database, wherein at least two of the plurality of data elements are from different data sources in the in-memory database, and prior to executing the query against the data element stored in the in-memory database, the different data sources are replicated to the in-memory database from one or more enterprise systems communicably coupled to the in-memory database.

17. The apparatus of claim 16, wherein executing a query against a data element stored in an in-memory database comprises executing a query against a data element stored in an in-memory database with an in-memory computational engine in the in-memory database.

18. The apparatus of claim 11, wherein the operations further comprise:

identifying a plurality of additional users from results of the query, the additional users associated with the data element based on a relationship between each of the additional users and the first user defined by the particular attribute; and dynamically generating a graphical network representing the first user, the plurality of additional users, and the relationship between each of the additional users and the first user defined by the particular attribute, where the first user and the plurality of additional users are represented as nodes in the graphical network and the relationship between each of the additional users and the first user defined by the particular attribute are represented as connections between nodes.

19. A computing system, comprising a memory, one or more processors, and instructions stored on the memory and operable when executed by the one or more processors to cause the computing system to perform operations comprising:

identifying a user profile associated with a first user, the user profile associated with a computer-implemented social networking service;

identifying a first change to a first data object stored and provided by a first data system as the first change occurs and a second change to a second data object stored and provided by a second data system as the second change occurs, wherein the first and the second data objects are associated with one or more attributes of the user profile, the first and the second data systems both stored in the in-memory database;

aggregating, in real-time, data representative of the first change as the first change occurs within the first data system and representative of the second change as the second change occurs within the second data system to update, in real-time, the user profile;

providing, based on the aggregated data, a permission model associated with the computer-implemented social networking service;

identifying a change to the permission model, and in response, updating the in-memory database in real-time;

identifying a particular attribute of the one or more attributes in the updated user profile that is associated with the first user and related to a current project of the first user, the particular attribute comprising a role of the first user within a business enterprise associated with one or more enterprise projects, enterprise expertise, or enterprise working groups;

executing a query against a data element stored in an in-memory database, the query including the particular attribute in the updated user profile and an identification of the current project;

identifying a second user from results of the query, the second user associated with the data element based on a relationship between the second user and the first user defined by the particular attribute and the current project; and generating displayable information associated with the second user.

20. The system of claim 19, wherein the data element is a data cube.

21. The system of claim 19, wherein the operations further comprise performing at least one of:

presenting an interface operable to allow the first user to email the second user;

presenting an interface operable to allow the first user to send an invitation to the second user;

presenting an interface operable to allow the first user to export information to the second user; or presenting an interface to allow additional searches of data elements in the in-memory database based on the information associated with the second user.

22. The system of claim 19, wherein the information associated with the second user includes a user profile of the second user.

23. The system of claim 19, wherein the operations further comprise:

identifying a change to the data element; and updating the displayable information associated with the second user based on the change to the data element.

24. The system of claim 19, wherein the query is executed against a plurality of data elements in the in-memory database, wherein at least two of the plurality of data elements are from different data sources in the in-memory database, and prior to executing the query against the data element stored in the in-memory database, the different data sources are replicated to the in-memory database from one or more enterprise systems communicably coupled to the in-memory database.

25. The system of claim 24, wherein executing a query against a data element stored in an in-memory database comprises executing a query against a data element stored in an in-memory database with an in-memory computational engine in the in-memory database.

26. The system of claim 19, wherein the operations further comprise:

identifying a plurality of additional users from results of the query, the additional users associated with the data element based on a relationship between each of the additional users and the first user defined by the particular attribute; and dynamically generating a graphical network representing the first user, the plurality of additional users, and the relationship between each of the additional users and the first user defined by the particular attribute, where the first user and the plurality of additional users are represented as nodes in the graphical network and the relationship between each of the additional users and the first user defined by the particular attribute are represented as connections between nodes.

\* \* \* \* \*